United States Patent
Oliver et al.

(10) Patent No.: US 7,203,635 B2
(45) Date of Patent: Apr. 10, 2007

(54) LAYERED MODELS FOR CONTEXT AWARENESS

(75) Inventors: Nuria M. Oliver, Kirkland, WA (US); Eric J. Horvitz, Kirkland, WA (US); Ashutosh Garg, Urbana, IL (US)

(73) Assignee: Microsoft Corporation, Redmond, WA (US)

( * ) Notice: Subject to any disclaimer, the term of this patent is extended or adjusted under 35 U.S.C. 154(b) by 831 days.

(21) Appl. No.: 10/183,774

(22) Filed: Jun. 27, 2002

(65) Prior Publication Data

US 2004/0002838 A1    Jan. 1, 2004

(51) Int. Cl.
G06F 9/45 (2006.01)
G06F 3/00 (2006.01)

(52) U.S. Cl. ............... 703/22; 715/708; 715/713; 715/861; 706/16; 706/20; 706/21; 706/22; 345/156; 345/158

(58) Field of Classification Search ........... 703/2, 703/22; 716/16, 20; 715/708, 713, 861; 706/20, 21, 22; 345/156, 158
See application file for complete search history.

(56) References Cited

U.S. PATENT DOCUMENTS

| | | | |
|---|---|---|---|
| 4,742,558 A * | 5/1988 | Ishibashi et al. ............ 382/240 |
| 5,294,792 A * | 3/1994 | Lewis et al. ................. 250/221 |
| 5,493,692 A | 2/1996 | Theimer et al. |
| 5,544,321 A | 8/1996 | Theimer et al. |
| 5,555,376 A | 9/1996 | Theimer et al. |
| 5,603,054 A | 2/1997 | Theimer et al. |
| 5,611,050 A | 3/1997 | Theimer et al. |
| 5,684,924 A * | 11/1997 | Stanley et al. ............... 704/233 |
| 5,774,357 A * | 6/1998 | Hoffberg et al. ............ 713/600 |
| 5,799,132 A * | 8/1998 | Rizzotto et al. ............. 706/8 |
| 5,822,465 A * | 10/1998 | Normile et al. ............. 382/253 |
| 5,842,194 A * | 11/1998 | Arbuckle ..................... 706/52 |
| 5,902,968 A * | 5/1999 | Sato et al. ................... 178/19.01 |
| 5,960,124 A * | 9/1999 | Taguchi et al. ............. 382/284 |
| 6,044,343 A * | 3/2000 | Cong et al. .................. 704/236 |
| 6,081,261 A * | 6/2000 | Wolff et al. .................. 345/179 |
| 6,092,045 A * | 7/2000 | Stubley et al. ............. 704/254 |
| 6,151,574 A * | 11/2000 | Lee et al. .................... 704/256 |

(Continued)

FOREIGN PATENT DOCUMENTS

WO    9800787    1/1998

OTHER PUBLICATIONS

Shai Fine, Yoram Singer, and Naftali Tishby, The Hierarchical Hidden Markov Model:Analysis and Applications, 1998,Machine Learning.*

(Continued)

*Primary Examiner*—Kamini Shah
*Assistant Examiner*—Kibrom K. Gebresilassie
(74) *Attorney, Agent, or Firm*—Amin, Turocy, & Calvin, LLP

(57) ABSTRACT

The present invention relates to a system and methodology providing layered probabilistic representations for sensing, learning, and inference from multiple sensory streams at multiple levels of temporal granularity and abstraction. The methods facilitate robustness to subtle changes in environment and enable model adaptation with minimal retraining. An architecture of Layered Hidden Markov Models (LHMMs) can be employed having parameters learned from stream data and at different periods of time, wherein inferences can be determined relating to context and activity from perceptual signals.

42 Claims, 9 Drawing Sheets

U.S. PATENT DOCUMENTS

| | | | |
|---|---|---|---|
| 6,370,504 B1* | 4/2002 | Zick et al. | 704/251 |
| 6,466,232 B1* | 10/2002 | Newell et al. | 715/700 |
| 6,513,046 B1 | 1/2003 | Abbott, III et al. | |
| 6,549,915 B2 | 4/2003 | Abbott, III et al. | |
| 6,556,960 B1* | 4/2003 | Bishop et al. | 703/2 |
| 6,563,503 B1* | 5/2003 | Comair et al. | 345/473 |
| 6,570,555 B1* | 5/2003 | Prevost et al. | 345/156 |
| 6,655,963 B1* | 12/2003 | Horvitz et al. | 434/236 |
| 6,747,675 B1 | 6/2004 | Abbott et al. | |
| 6,752,317 B2* | 6/2004 | Dymetman et al. | 235/462.45 |
| 6,791,580 B1 | 9/2004 | Abbott et al. | |
| 6,801,223 B1 | 10/2004 | Abbott et al. | |
| 6,812,937 B1 | 11/2004 | Abbott et al. | |
| 6,842,877 B2* | 1/2005 | Robarts et al. | 715/708 |
| 6,950,796 B2* | 9/2005 | Ma et al. | 704/244 |
| 7,098,891 B1* | 8/2006 | Pryor | 345/158 |
| 2001/0038711 A1* | 11/2001 | Williams et al. | 382/181 |
| 2001/0040590 A1 | 11/2001 | Abbott et al. | |
| 2001/0040591 A1 | 11/2001 | Abbott et al. | |
| 2001/0043231 A1 | 11/2001 | Abbott et al. | |
| 2001/0043232 A1 | 11/2001 | Abbott et al. | |
| 2002/0020750 A1* | 2/2002 | Dymetman et al. | 235/472.01 |
| 2002/0032689 A1 | 3/2002 | Abbott, III et al. | |
| 2002/0044152 A1 | 4/2002 | Abbot, III et al. | |
| 2002/0052930 A1 | 5/2002 | Abbott et al. | |
| 2002/0052963 A1 | 5/2002 | Abbott et al. | |
| 2002/0054130 A1 | 5/2002 | Abbott, III et al. | |
| 2002/0054174 A1 | 5/2002 | Abbott et al. | |
| 2002/0059159 A1* | 5/2002 | Cook | 706/62 |
| 2002/0078204 A1 | 6/2002 | Newell et al. | |
| 2002/0080155 A1 | 6/2002 | Abbott et al. | |
| 2002/0080156 A1 | 6/2002 | Abbott et al. | |
| 2002/0083025 A1 | 6/2002 | Robarts et al. | |
| 2002/0083158 A1 | 6/2002 | Abbott et al. | |
| 2002/0087525 A1 | 7/2002 | Abbott et al. | |
| 2002/0099817 A1 | 7/2002 | Abbott et al. | |
| 2003/0046401 A1 | 3/2003 | Abbott et al. | |
| 2003/0112987 A1* | 6/2003 | Nordqvist et al. | 381/312 |
| 2003/0154476 A1 | 8/2003 | Abbott, III et al. | |
| 2004/0083013 A1* | 4/2004 | Tolley | 700/47 |
| 2005/0033573 A1* | 2/2005 | Hong et al. | 704/250 |
| 2005/0034078 A1 | 2/2005 | Abbott et al. | |
| 2005/0090911 A1* | 4/2005 | Ingargiola et al. | 700/36 |
| 2005/0124863 A1* | 6/2005 | Cook | 600/300 |
| 2005/0228763 A1* | 10/2005 | Lewis et al. | 706/1 |

OTHER PUBLICATIONS

Somboon Hongeng, Francois Bremond, and Rakant Nevatia, Representation and Optimal Recognition of Human Activties,Mar. 2000,Institute for Robotics and Intelligent Systems,pp. 1-8.*

Somboon Hongeng, Francois Bremond, and Ramakant Nevatia, "Representation and Optimal Recognition of Human Activities", Institute for Robotics and Intelligent Systems, University of Southern California, Mar. 2000, pp. 1-8 and extra one page showing the creation of the PDF.*

Shai Fine, Yoram Singer, and Naftali Tishby, "The Hierarchical Hidden Markov Model: Analysis and Applications", Machine Learning, 1998, total pages of 13.*

S. Fine, Y. Singer, and N. Tishby, "The Hierarchical Hidden Markov Model". 1998.*

S. Hongeng, F. Bremond, and R. Nevatia, "Representation and Optimal Recognition of Human Activities". Mar. 17, 2000.*

N. M. Oliver, B. Rosario, and A. P. Pentland, "A Bayesian Computer Vision System for Modeling Human Interactions". Aug. 2000 IEEE.*

S. E. George, "Spatio-Temporal Analysis with the Self-Organizing Feature Map". Knowledge and Information Systems. May 2000.*

A. Dolamis, and G. Tziritas, "Adaptable Neural Networks for Content-based Video Adaptation in Low/Variable Bandwidth Communications Networks". PDF file created on Feb. 2, 2006.*

G. Potamianos, C. Neti, G. Gravier, A. Garg, and Andrew W.,"Recent Advances in the Automatic Recognition of Audio-Visual Speech". IEEE. vol. 91. No. 9. Sep. 2003.*

R. Battiti, A. Villani, and T. L. Nhat, "Neural network models for intelligent networks: deriving the location from signal patterns". PDF file created on Apr. 29, 2002.*

D. Zhang, and Dan Ellis, "Detecting sound events in basketball video archive". PDF file created on Apr. 30, 2001.*

E. Horvitz, "Uncertainty, Action, and Interaction: In Pursuit of Mixed-Initiative Computing." Intelligent System. Sep./Oct. 1999 IEEE.*

Event Structure in Perception and Conception, Psychological Bulletin 2001 vol. 127, 21 pages By: Jeffery M. Zacks & Barbara Tversky.

Recognition and Interpretation of Parametric Gesture, M.I.T. Media Laboratory Perceptual Computing Section Technical Report No. 421, Submitted to: International Conference on Computer Vision, 1998, 9 pages, By: Andrew D. Wilson and Aaron F. Bobick.

Real-Time American Sign Language Recognition from Video Using Hidden Markov Models, M.I.T. Media Laboratory Perceptual Computing Section Technical Report No. 375, An earlier version appeared ISCV 1995, 7pages, By: Thad Starner and Alex Pentland.

A Tutorial on Hidden Markov Models and Selected Applications in Speech Recognition, Proceeding of the IEEE, vol. 77, No. 2, Feb. 1989, 29 pages, By: Lawrence R. Rabiner, Fellow, IEEE.

A Bayesian Approach to Human Activity Recognition, *This research was supported in part by the Army Research Office under contracts DA AH04-95-1-0494 and DAAG55-98-1-0230, and by the Texas Higher Education Coordination Board, Advanced Research Project 97-ARP-275, 8 pages, By: Anant Madabhushi and J.k. Aggarwal.

Judging People's Availability for Interaction from Video Snapshots, 1999 IEEE, Published in the Proceedings of the Hawaii International Conference On Systems Science, Jan. 5-8, 1999, 9 pages By: Brad Johnson and Saul Greenberg.

Recognition of Visual Activities and Interactions by Stochastic Parsing, IEEE Transactions on Pattern Analysis and Machine Intelligence, vol. 22, No. 8, Aug. 2000, 20 pages, By: Yuri A. Ivanov and Aaron F. Bobick.

A Framework for Recognizing Multi-Agent Action from Visual Evidence, M.I.T. Media Laboratory Perceptual Section Technical Report No. 489, Apr. 1999, Appears in Proceedings of the National Conference on Artifical Intelligence (AAAI), Jul. 1999,7 pages, By: Stephen S. Intille and Aaron F. Bobick.

Towards Perceptual Intelligence: Statistical Modeling of Human Individual and Interactive Behavior, Submitted to the Program in Media Arts and Sciences School of Architecture and Planning in the Partial Fulfillment of the Requirements for the Degree of Doctor Of Philosophy at the Massachusetts Insitiute of Technology, Jun. 2000, 297 pages, By; Nuria M. Oliver.

Principles of Mixed-Initiative User Interfaces, Microsoft Research, Redmond, Washington 98025 USA, 8 pages, By: Eric Horvitz.

Automatic Symbolic Traffic Scene Analysis Using Belief Networks, Computer Science Division University of California, Berkley, CA 94720, 7 pages, By: T. Huang, D. Koller, J. Malik.

Attention-Sensitive Alerting, In Proceedings of UAI 1999 Conference on Uncertainty and Artificial Intelligence, Stockholm, Sweden, Jul. 1999. Morgan Kaufman: San Francisco. pp. 305-313, By: Eric Horvitz, Andy Jacobs, and David Howel.

Representation and Optimal Recognition of Human Activities, Institute for Robotics and Intelligent Systems, University of Southern California, Los Angeles, California, 90089, 8 pages, By: Somboon Hongeng, Francois Bremond, and Ramakant Navatia.

Learning Variable Length Markov Models of Behaviour, School of Computing, The University of Leeds, Leeds, LS2 9JT,33 pages, By: Aphrodite Galata, Neil Johnson, David Hogg.

The Hierarchical Hidden Markov Model: Analysis and Applications Institute of Computer Science and Center for Neural Computation, The Hebrew University, 13 pages. By: Shai Fine, Yoram Singer, Naftali Tishby.

Building Qualitative Event Models Automatically from Visual Input, School of Computer Studies, University of Leeds, LS2 9JT, UK, 6 pages, By: J Fernyhough, A G Cohn, D C Hogg.

Discrete-Time Processing of Speech Signals, Micmillan Publishing Company, Maxwell Macmillan Canada, Maxwell International, 65 pages, By: John R. Deller, Jr., John G. Proakis, and John H. Hansen.

Probabilistic Temporal Reasoning, Department of Computer Sciences, Brown University, 5 pages, By: Thomas Dean and Keiji Kanazawa.

The Representation and Recognition of Action Using Temporal Templates, M.I.T. Media Library Perceptual Computing Science Technical Report No. 402, Appears in: IEEE Conference on Computer Vision and Pattern Recognition (CVPR '97), 7 pages, By: James W. David and Aaron F. Bobick.

Unsupervised Clustering of Ambulatory Audio and Video, Perceptual Computing, MIT Media Lab, 4 pages, By: Brian Clarkson and Alex Pentland.

Advanced Visual Serveillance using Bayesian Networks, 12 pages, By: Hilary Buzton and Shaogang Gong.

A Pratical Methodology for Speech Source Localization With Microphone Arrays, 39 pages, By: Michael S. Brandstein and Harvey F. Silverman.

Discovery and Segmentation of Activities in Video, IEEE Transactions of Pattern Analysis and Machine Intelligence, vol. 22, No. 8, Aug. 2000, 8 pages. By: Matthew Brand and Vera Kettnaker.

Coupled Hidden Markov Models for Complex Action Recognition, Vision and Modeling Group, MIT Media Lab, 6 pages, By: Matthew Brand, Nuria Oliver, and Alex Pentland.

Adaptive Probabilistic Networks with Hidden Variables, Kluwer Academic Publishers, Boston, 34 pages, By: John H. Binder, Daphne Koller, Stuart Russell, and Keiji Kanazawa.

Fundamentals of Speech Recognition, Chapter 3, Signal Processing and Analysis Methods for Speech Recognition, Library of Congress Cataloging-in-Publication Data, 71 pages, By: Lawrence Rabiner and Biing-Hwang Juang.

Andy Harter, et al., A Distributed Location System for the Active Office, IEEE Network, 1994, pp. 62-70.

Guanling Chen, et al., A Survey of Context-Aware Mobile Computing Research, Dartmouth Computer Science Technical Report, 2000, 16 pages.

William Noah Schilt, A System Architecture for Context-Aware Mobile Computing, Columbia University, 1995, 153 pages.

Mike Spreitzer, et al., Providing Location Information in a Ubiquitous Computing Environment, SIGOPS '93, 1993, pp. 270-283.

Marvin Theimer, et al., Operating System Issues for PDAs, In Fourth Workshop on Workstation Operating Systems, 1993, 7 pages.

Roy Want, Active Badges and Personal Interactive Computing Objects, IEEE Transactions on Consumer Electronics, 1992, 11 pages, vol. 38—No. 1.

Bill N. Schilit, et al., The ParcTab Mobile Computing System, IEEE WWOS-IV, 1993, 4 pages.

Bill Schilit, et al., Context-Aware Computing Applications, In Proceedings of the Workshop on Mobile Computing Systems and Applications, Dec. 1994. pp. 85-90.

Bill N. Schilit, et al., Customizing Mobile Applications, Proceedings USENIX Symposium on Mobile and Location Independent Computing, Aug. 1993, 9 pages.

Mike Spreitzer, et al., Architectural Considerations for Scalable, Secure, Mobile Computing with Location Information, In The 14th International Conference on Distributed Computing Systems, Jun. 1994, pp. 29-38.

Mike Spreitzer et al., Scalable, Secure, Mobile Computing with Location Information, Communications of the ACM, Jul. 1993, 1 page, vol. 36—No. 7.

Roy Want, et al., The Active Badge Location System, ACM Transactions on Information Systems, Jan. 1992, pp. 91-102, vol. 10—No. 1.

Mark Weiser, Some Computer Science Issues in Ubiquitous Computing, Communications of the ACM, Jul. 1993, pp. 75-84, vol. 36—No. 7.

M. Billinghurst, et al., An Evaluation of Wearable Information Spaces, Proceedings of the Virtual Reality Annual International Symposium, 1998, 8 pages.

Bradley J. Rhodes, Rememberance Agent: A continuously running automated information retrieval system, The Proceedings of The first International Conference on The Practical Application Of Intelligent Agents and Multi Agent Technology, 1996, pp. 487-495.

Eric Horvitz, et al., In Pursuit of Effective Handsfree Decision Support: Coupling Bayesian Inference, Speech Understanding, and User Models, 1995, 8 pages.

Bradley J. Rhodes, The Wearable Rememberance Agent: A System for Augmented Theory, The Proceedings of The First International Symposium on Wearable Computers, Oct. 1997, pp. 123-128.

Eric Horvitz, et al., Attention-Sensitive Alerting in Computing Systems, Microsoft Research, Aug. 1999.

Bill N. Schilit, et al., Disseminationg Active Map Information to Mobile Hosts, IEEE Network, 1994, pp. 22-32, vol. 8—No. 5.

Mark Billinghurst, et al., Wearable Devices: New Ways to Manage Information, IEEE Computer Society, Jan. 1999, pp. 57-64.

Thad Eugene Starner, Wearable Computing and Contextual Awareness, Massachusetts Institute of Technology, Jun. 1999, 248 pages.

Bradley J. Rhodes, the Wearable Rememberance Agent: A System for Augmented Memory, Personal Technologies Journal Special Issue on Wearable Computing, 1997, 12 pages.

Workshop on Wearable Computing Systems, Aug. 19-21, 1996.

Mark Billinghurst, Research Directions in Wearable Computing, University of Washington, May 1998, 48 pages.

Mark Weiser, The Computer for the 21st Century, Scientific American, Sep. 1991, pp. 94-104, vol. 265—No. 3.

Nuria Oliver, et al., Hierarchical Representations for Learning and Inferring Office Activity from Multiple Sensory Channels, Microsoft Research, Jan. 2002, 14 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 pages.

Robert M. Losee, Jr., Minimizing information overload: the ranking of electronic messages, Journal of Information Science 15, Elsevier Science Publishers B.V., 1989, pp. 179-189.

A Bayesian Approach to Human Activity Recognition, *This research was supported in part by the Army Research Office under contracts DA AH04-95-1-0494 and DAAG55-98-1-0230, and by the Texas Higher Education Coordination Board, Advanced Research Project 97-ARP-275, 8 pages, By: Anant Madabhushi and J.k. Aggarwal, no date.

Principles of Mixed-Initiative User Interfaces, Microsoft Research, Redmond, Washington 98025 USA, 8 pages, By: Eric Horvitz, 1999.

Automatic Symbolic Traffic Scene Analysis Using Belief Networks, Computer Science Division University of California, Berkley, CA 94720, 7 pages, By: T. Huang, D. Koller, J. Malik, no date.

Representation and Optimal Recognition of Human Activities, Institute for Robotics and Intelligent Systems, University of Southern California, Los Angeles, California, 90089, 8 pages, By: Somboon Hongeng, Francois Bremond, and Ramakant Navatia, Mar. 17, 2000.

Learning Variable Length Markov Models of Behaviour, School of Computing, The University of Leeds, Leeds, LS2 9JT,33 pages, By: Aphrodite Galata, Neil Johnson, David Hogg, 2001.

The Hierarchical Hidden Markov Model: Analysis and Applications Institute of Computer Science and Center for Neural Computation, The Hebrew University, 13 pages. By: Shai Fine, Yoram Singer, Naftali Tishby, 1998.

Building Qualitative Event Models Automatically from Visual Input, School of Computer Studies, University of Leeds, LS2 9JT, UK, 6 pages, By: J Fernyhough, A G Cohn, D C Hogg, 1998.

Discrete-Time Processing of Speech Signals, Micmillan Publishing Company, Maxwell Macmillan Canada, Maxwell International, 65 pages, By: John R. Deller, Jr., John G. Proakis, and John H. Hansen, 1993.

Probabilistic Temporal Reasoning, Department of Computer Sciences, Brown University, 5 pages, By: Thomas Dean and Keiji Kanazawa, 1988.

Unsupervised Clustering of Ambulatory Audio and Video, Perceptual Computing, MIT Media Lab, 4 pages, By: Brian Clarkson and Alex Pentland, 1999.

Advanced Visual Serveillance using Bayesian Networks, 12 pages, By: Hilary Buzton and Shaogang Gong, no date.

A Pratical Methodology for Speech Source Localization With Microphone Arrays, 39 pages, By: Michael S. Brandstein and Harvey F. Silverman, Nov. 13, 1996.

Coupled Hidden Markov Models for Complex Action Recognition, Vision and Modeling Group, MIT Media Lab, 6 pages, By: Matthew Brand, Nuria Oliver, and Alex Pentland, no date.

Adaptive Probabilistic Networks with Hidden Variables, Kluwer Academic Publishers, Boston, 34 pages, By: John H. Binder, Daphne Koller, Stuart Russell, and Keiji Kanazawa, Mar. 24, 1997.

Fundamentals of Speech Recognition, Chapter 3, Signal Processing and Analysis Methods for Speech Recognition, Library of Congress Cataloging-in-Publication Data, 71 pages, By: Lawrence Rabiner and Biing-Hwang Juang, 1993.

* cited by examiner

LAYERED MODELS FOR CONTEXT AWARENESS

TECHNICAL FIELD

The present invention relates generally to computer systems, and more particularly to a system and method to automatically recognize activities and context via a hierarchical (layered) probabilistic approach while analyzing multiple input streams of diverse nature in accordance with multiple levels of temporal granularity.

BACKGROUND OF THE INVENTION

Computer models provide the basis for many analytical systems especially in the area of artificial intelligence. Previous work in this area has explored the fusion of multiple sources of information to reason about higher-level abstractions relating to human context in computer systems operations. Recent work on probabilistic models employed for reasoning about a user's location, intentions, and focus of attention have highlighted opportunities for building new kinds of applications and services. A portion of such work leverages perceptual information to recognize human activities and is centered on identification of a specific type of activity in a particular scenario. Many of these techniques are targeted at recognizing single, simple events (e.g., 'waving a hand' or 'sitting on a chair'). However, less effort has been applied to methods for identifying more complex patterns of human behavior, extending over longer periods of time.

Dynamic models of periodic patterns associated with people movements are employed by some methods to capture periodicity of activities such as walking. Other approaches to human activity recognition employ graphical models. A significant portion of work in this area has made use of Hidden Markov Models (HMMs). As an example, HMMs have been utilized for recognizing hand movements to relay symbols in American Sign Language, wherein different signs can be recognized by computing probabilities for models that different symbols may produce given an observed visual sequence. More complex models, such as Parameterized-HMM (PHMM), Entropic-HMM, Variable-length HMM (VHMM), and Coupled-HMM (CHMM), have been utilized to recognize more complex activities such as the interaction between two people. One method proposes a stochastic, context-free grammar to compute the probability of a temporally consistent sequence of primitive actions recognized by HMMs.

Other methods model events and scenes from audiovisual information. For example, these methods have developed a wearable computer system that utilizes a plurality of HMMs for recognizing the user's location, (e.g., in the office, at the bank, and so forth). Still yet other techniques propose an entropic-HMM approach to organize observed video activities (e.g., office activity and outdoor traffic) into meaningful states, wherein the models can be adapted in video monitoring of activities such as outdoor traffic, for example. In another approach, a probabilistic finite-state automaton (a variation of structured HMMs) is employed for recognizing different scenarios, such as monitoring pedestrians or cars on a freeway. Although standard HMMs appear to be robust to changes with respect to temporal segmentation of observations, they tend to suffer from a lack of structure, an excess of parameters, and an associated over-fitting of data when applied to reason about long and complex temporal sequences with inadequate training data. In recent years, more complex Bayesian networks have been adopted for modeling and recognition of human activities. To date, however, there has been little advancement on methods for exploiting statistical processes to fuse multiple sensory streams that address modeling problems with robustness and mitigate model training efforts.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology within machine learning that allows robust and efficient modeling of dynamic, human patterns of behavior from heterogeneous streams of data. A machine learning system is provided to model and recognize types of real-time human activities in real-life environments, such as in an office or workplace, for example. The learning system and processes relating thereto address problems associated with accurately recognizing and anticipating real-time human activities in a hierarchical manner. The present invention facilitates a robust machine learning system that monitors multiple input sources (e.g., video, audio, keyboard, mouse, telephone, and so forth) and builds models of various human activities from the input source data. The invention allows for context aware systems, such as computer systems that model the user's context and employ it to determine inferences about the user's internal states. The modeling can be achieved via Layered Hidden Markov Models (LHMMs) that facilitate a hierarchical, concrete, real-time, and multi-modal activity-recognition approach to becoming context aware of a human's environment and activities such that human needs may be more accurately and automatically anticipated by the computer.

In one aspect, the present invention facilitates performing automatic and semiautomatic recognition of activity and context from multiple perceptual cues. This can include processes for learning and reasoning about streams of perceptual evidence from visual, acoustic, and kinesthetic channels that accelerate development of a variety of compelling applications and services that hinge on identification of rich, human-centric notions of context. In addition, creating more robust learning and modeling methods for reasoning about information derived from multiple channels enables other systems and processes such as in the realms of multi-modal human-computer interaction (HCI), intelligent environments, and/or visual surveillance.

According to another aspect of the present invention, inference analysis can be performed that takes as inputs raw signals coming from multiple sensors and yields high-level abstract descriptions of the human activities. Thus, the task of moving from low-level signals to more abstract hypotheses about activity brings into focus a consideration of a spectrum of analytical techniques. This can include template matching, context-free grammars, and various other statistical methods.

In accordance with another aspect of the present invention, a layered statistical technique or process is provided for detecting and recognizing human activities based on multiple streams of sensory information. The process is based on a formulation of dynamic graphical models that are referred to as Layered Hidden Markov Models. These layered or hierarchical models facilitate building substantially robust context-recognition systems that process multiple levels of time granularity. In contrast, non-hierarchical modeling techniques can be very sensitive to subtle variations in a target environment and can require extensive retraining when moved to another similar environment. Hierarchical statistical models also support a factoring of a learning and inference problem into multiple, smaller sub-problems, thus producing decompositions along lines of variation and stability.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology providing layered probabilistic representations for sensing, learning, and inference from multiple sensory streams at multiple levels of temporal granularity and abstraction. The methods facilitate robustness to subtle changes in environment and enable model adaptation with minimal retraining. Layered Hidden Markov Models (LHMMs) can be employed having parameters learned from stream data and at different time granularities, wherein inferences can be determined relating to context and activity from perceptual signals.

Figure 1:
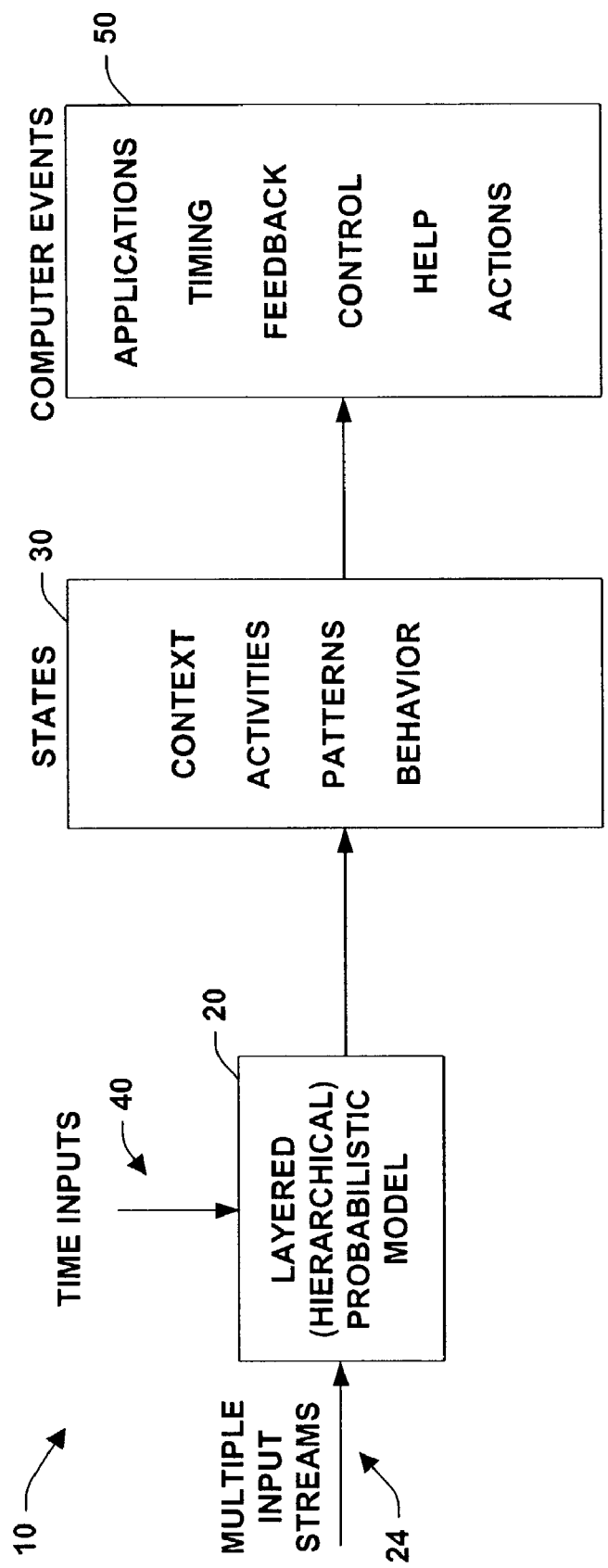
FIG. 1 is a schematic block diagram illustrating a hierarchical probabilistic model in accordance with an aspect of the present invention.

Referring initially to FIG. 1, a hierarchical or layered analysis system 10 is illustrated in accordance with an aspect of the present invention. A layered probabilistic model (LPM) 20 analyzes multiple input streams 24 to determine one or more states 30 associated with human characteristics. The input streams 24 can include substantially any type of data such as audio, video, computer activities (e.g., mouse movements, applications activity, keyboard strokes, and so forth), and telephone activities, for example. The LPM 20 is configured as a layered structure, wherein respective layers can include one or more probability models to analyze the input streams 24. A plurality of time series data (stream data) 40 are received by the LPM 20 and are applied as sample inputs to the respective layers, whereby the time inputs are generally arranged in a descending order of temporal granularity, (e.g., the higher the layer, the smaller its time granularity and consequently the higher the temporal abstraction modeled by that layer). For example, if the data at a first layer was sampled every (25) milliseconds, a second layer may be sampled every (150) milliseconds whereas a subsequent layer may be sampled at time periods greater than one second. It is to be appreciated that substantially any time sampling period can be selected.

The LPM 20 analyzes the input streams 24 in accordance with the layers and time series data 40 to determine the states 30. The states 30 can include context states such as what is a user doing, how busy the user is, how focused the user is, and where attentional resources of the user are being applied, for example. Other states can include user activities (e.g., phone conversation, face-face conversation, presentation, distant conversation, nobody in the office, user present, other activity engaged), patterns of behavior, emotions (e.g., happy, upset, tired, relaxed, excited), and so forth. This can also include inferences about possible states and/or implied user states. From the state information at 30, one or more computer events 50 can be anticipated, altered, tuned, and/or adjusted in accordance with the determined state. For example, applications may be invoked and/or adjusted based upon the state information (e.g., bringing an instant messenger display to the foreground based on a determined state of availability to receive messages, saving a file based upon a determined state of being away from a desktop, identifying a person in a surveillance application). Other events that can be controlled include timing (e.g., delaying/forwarding a message or other computer activity based upon state), providing feedback (e.g., invoking a dialog session based upon a determination of confusion), changing or adjusting one or more controls (e.g., automatically turning CD player down when another user is detected in the room, automatically invoking/adjusting desktop controls based upon state). This can also include such events 50 as providing help or information utilities to the user based on the determined state 30 and include substantially any action that can be performed on a computer (e.g., executing a subsequent algorithm or control based upon determined state).

Figure 2:
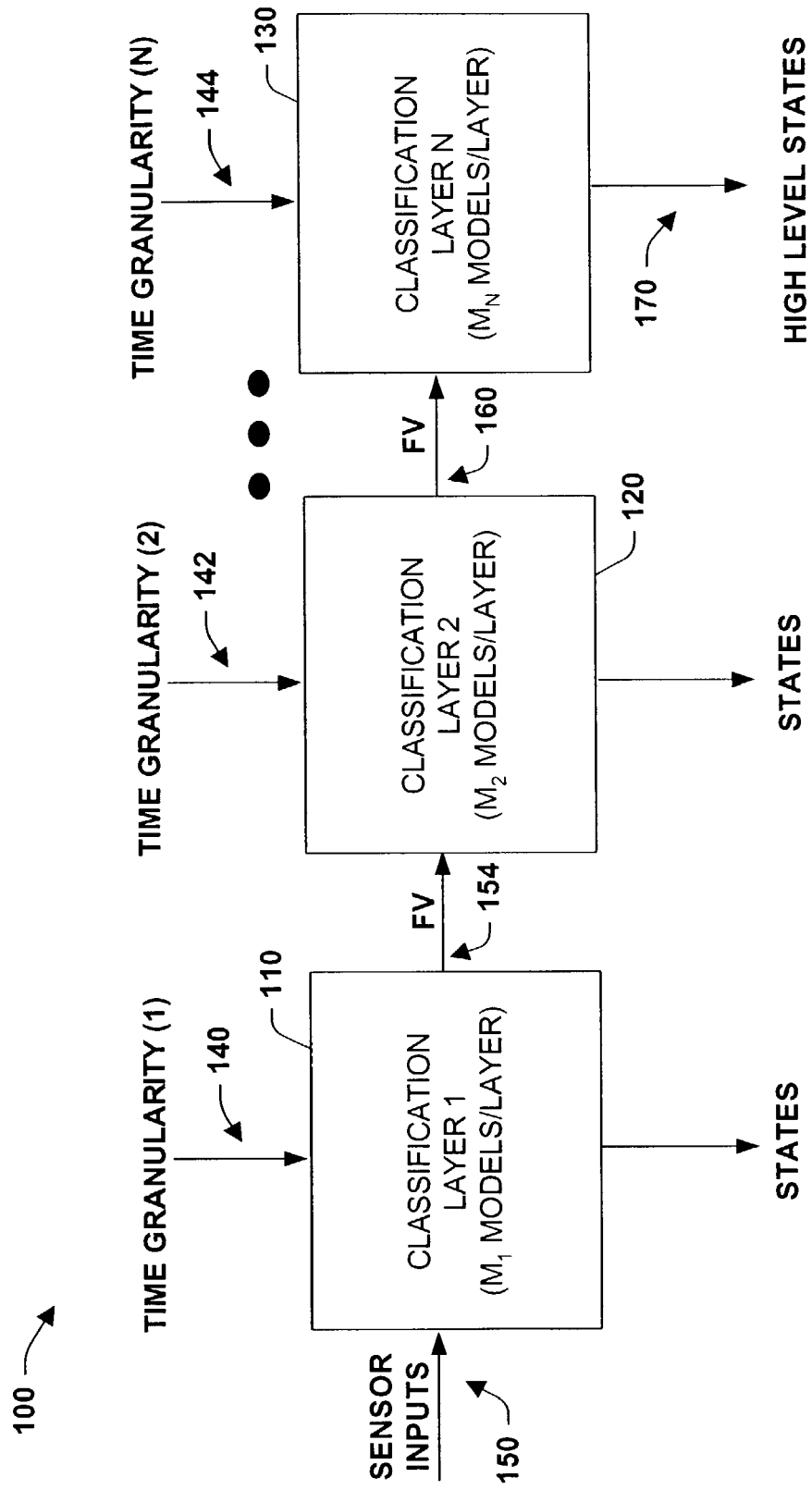
FIG. 2 is a diagram illustrating a layered probabilistic architecture in accordance with an aspect of the present invention.

Referring now to FIG. 2, a layered classification system 100 is illustrated in accordance with an aspect of the present invention. The system 100 includes N classification layers 110 through 130, N being an integer, wherein respective layers are adapted with M probability models per layer, M being an integer. It is noted that M1 is subscripted to a layer number such that $M_1$ relating to $Layer_1$ may be a different number of probability models than $Layer_2$ having $M_2$ such models. Thus, $Layer_N$ at 130 may have $M_N$ models configured, wherein subscript N denotes the respective layer and M describes the number of classes or probability models captured by the $N_{th}$ layer. Each layer i, $Layer_1$, processes data at its own time granularity $N_i$ As illustrated, the layers 110–130 receive time inputs at 140 through 144 respectively. As noted above, the time inputs 110–130 are generally arranged in descending order of time granularity, although some layers may be sampled at similar time periods. As one example, the layer 110 may be sampled at 100 microseconds and the layer at 120 may be sampled at 1 millisecond. At 150, one or more sensing inputs are processed by the layer at 110, wherein one or more feature vectors (described below) are generated at 154 and fed to the next stage at 120. The next stage 120 analyzes the feature vectors at 154 and generates one or more feature vectors at 160 that are processed by the stage at 130. The last stage, in this case the layer 130, produces one or more state outputs at 170 that reflect one or more human characteristics that are modeled by the respective stages and described above. It is noted that the system 100 can process information in a concurrent and/or serial manner, whereby respective stages 110–130 can perform aspects of parallel and/or serial processing.

Figure 3:
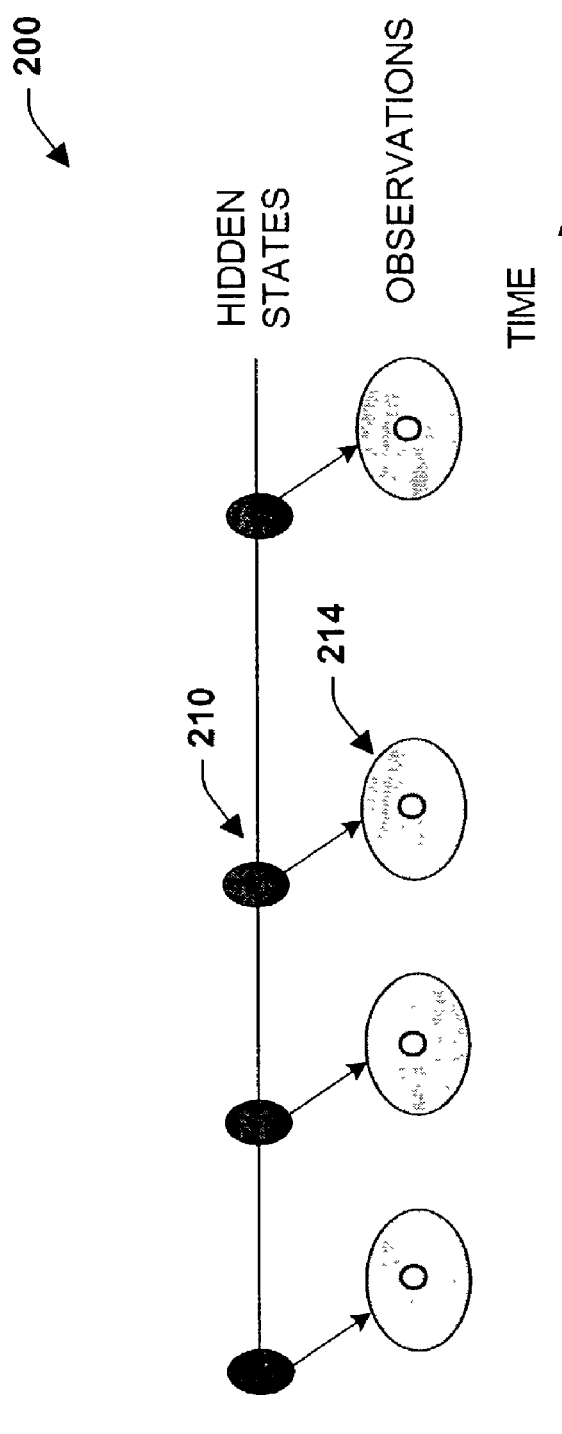
FIG. 3 is a diagram illustrating a single layer of a hierarchical probabilistic model in accordance with an aspect of the present invention.
Figure 4:
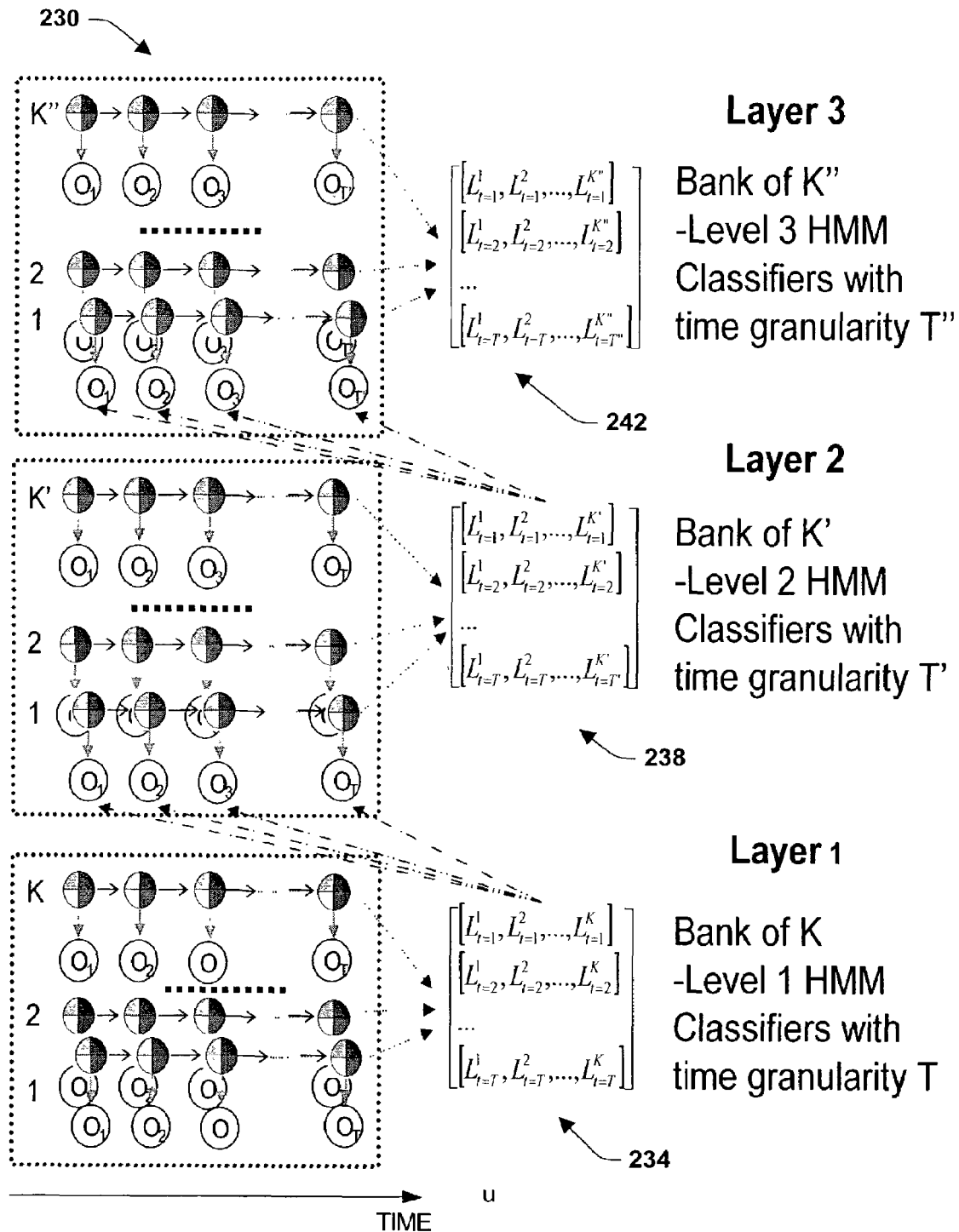
FIG. 4 is a diagram illustrating multiple layers of a hierarchical probabilistic model in accordance with an aspect of the present invention.

FIGS. 3 and 4 illustrate exemplary probability layers and associated models in accordance with the present invention. FIG. 3 depicts a single layer 200 having associated states 210 and observations 214 that are rolled-out in time. FIG. 4 illustrates a layered and hierarchically arranged architecture 230 providing three layers 234–242 having associated states and observations describing human behavior at different levels of temporal granularity. As noted above, N such layers may be similarly configured.

In one aspect of the present invention, the layers 234–242 provide a hierarchical approach to learning human activities from sensed/inferred data and employs directed acyclic graphs (DAGs), also referred to as Dynamic Bayesian Networks or Dynamic Graphical Models. Statistical DAGs can provide a computationally efficient and sufficiently expressive solution to the problem of human activity modeling and recognition. Hidden Markov Models (HMMs) and related extensions, (e.g., CHMMs, PHMMs, VHMMs), support the architecture illustrated at 230. Thus, layered HMMs or (LHMMs), can be viewed as particular cases of temporal DAGs.

DAGs generally include a set of random variables represented as nodes as well as directed edges or links between the nodes. They define a mathematical form of a joint or conditional Probability Distribution Function (PDF) between the random variables. From a human behavior perspective, DAGs can be utilized since they constitute a graphical representation of causal dependencies among variables. The absence of directed links between nodes implies a conditional independence. Moreover, a family of transformations can be performed on the graphical structure depicted at 230 that has a direct translation in terms of mathematical operations applied to the underlying PDF. Furthermore, DAGs are generally considered modular, (e.g., one can express a joint global PDF as the product of local conditional PDFs). In view of the above, DAGs present several advantages that are relevant to the problem of human behavior modeling from multiple sensors: they can handle incomplete data as well as uncertainty; they are trainable and provide a process for mitigating over-fitting; they encode causality in a natural way; algorithms exist for performing predictive inference; they offer a framework for combining prior knowledge and data; they are modular; and can be paralleled.

Hidden Markov Models are one of the most popular examples of DAGs for modeling processes that have structure in time. They provide clear Bayesian semantics, efficient algorithms for state and parameter estimation, and can automatically perform dynamic time warping. An HMM is essentially a quantization of a system's configuration space into a small number of discrete states, together with probabilities for transitions between states as illustrated at 230 of FIG. 4. A single, finite discrete variable indexes the current state of the system. Substantially any information about the history of the process needed for future inferences can be reflected in the current value of the state variable. Graphically HMMs are often depicted 'rolled-out in time' as DAGs, such as in FIG. 3, whereas FIG. 4 illustrates multiple layers having one or more HMMs per layer. It is to be appreciated that other models may be employed in accordance with the layered approach of the present invention such as Support Vector Machines (SVM), Naive Bayes, Bayesian Networks, Dynamic Graphical Models, Decision Trees, Similarity-based, Vector-based, and/or other learning models or combinations thereof.

The layered representation illustrated at 230 of FIG. 4 decomposes the parameter space in a manner that enhances the robustness of the system by reducing training and tuning requirements. In Layered HMMs (LHMMs), each layer of the architecture may be connected to the next layer via its inferential results. The representation segments the problem into distinct layers that operate at different temporal granularities—allowing for temporal abstractions from point-wise observations at particular times into explanations over varying temporal intervals. It is noted that temporal or time granularity in the previous context of discussion may correspond to a window size or vector length of the observation sequences in the HMMs. LHMMs can be regarded as a cascade of HMMs. One possible structure of a three-layer LHMM is displayed in FIG. 4.

A mathematical analysis will now be described in accordance with the layered representation 230 of FIG. 4. Formally, given a set of $T_L$ observations, $$O_L = \{O_1^L, O_2^L, \ldots, O_{T_L}^L\} = O^L(1:T_L),$$

at level L, the HMMs at this level can be thought of as a multiclass classifier mapping these $T_L$ observations to one of $K_L$ classes. Let $X^{T_i}$ be the sample space of vectors $O_i^L$. If $O_i^L \in X^{T_L}$, then the bank of $K_L$ HMMs (Note that one HMM may be configured for each class to classify, thus, these type of HMMs may be denoted as discriminative HMMs) can be represented as $f_L: X^{T_L} \to Y^L$, where $Y^L = \{1, \ldots, K_L\}$ is the discrete variable with the class label, i.e., the bank of HMMs is a function $f_L$ that outputs a class label every $T_L$ observations. The HMMs at the next level (L+1) take as inputs the outputs of the HMMs at level L, i.e., $$X^{T_{L+1}} = \{Y_1^L, \ldots, Y_{T_{L+1}}^L\},$$

and learn a new classification function with time granularity $T_{L+1}$, $f_{L+1}: X^{T_{L+1}} \to Y^{L+1}$. In this framework respective HMMs can be trained via a Baum-Welch algorithm, for example.

The layered representation illustrated at 230 of FIG. 4 facilitates robustness, training efficacy, and naturalness. In one aspect, the representation or framework facilitates decoupling different levels of analysis for training and inference. As it is described below, respective levels of the hierarchy can be trained independently, with different feature vectors and time granularities. In consequence, the lowest, signal-analysis layer, that is most sensitive to variations in the environment, can be retrained, while leaving the higher-level layers unchanged. For example, in an office setting, beyond robustness in a single office, the representation 230 facilitates models that perform suitably when transferred to different locations such as offices spaces while mitigating tuning efforts through retraining, for example.

There are several approaches to performing inference with LHMMs. In one approach, which is referred to as maxbelief, the model with the highest likelihood is selected, and this information is made available as an input to the HMMs at the next level. In a distributional approach, probability distribution information is passed over the models to the higher-level HMMs.

As an example, consider that K HMMs are trained at level L of the hierarchy, $M_k^L$, with $k=\{1, \ldots, K\}$. Let $$\Lambda(k, t)^L = \log(P(O(1:t) | M_k^L)) = \log \sum_i \alpha_t(i; M_k^L)$$

be the log-likelihood of model $M_k^L$ given various observations up to time t; and let $\alpha_1(i;M_k^L)$ be the alpha variable of the standard Baum-Welch algorithm at time t and for model $M_k^L$, i.e., $$\alpha_{t+1}(j; M_k^L) = \left[\sum_{i=1}^N \alpha_t(i; M_k^L) P_{j|i}^{M_k^L}\right] p_j(o_t; M_k^L),$$

where $$P_{i|j}^{M_k^L}$$

is the transition probability from state j to state i for model $M_k^L$, and $p_j(o_t; M_k^L)$ is the probability for state j in model $M^{kL}$ of observing $o_t$. At that level, the observations are classified by declaring $C(t)^L = \arg \max_k \Lambda(k)_t^L$, with $k=\{1, \ldots, K\}$. The next level of the hierarchy (L+1) could have two types of observations of $\tau$ temporal length, for example: (1) in the maxbelief approach, $C(1: \tau)^L$, i.e., the hard classification results from the previous level for each time step—and therefore a vector of $\tau$ discrete symbols in $\{1, \ldots, K\}$; or (2) in the distributional approach, $$\{\Lambda(1:K)_{t=1}^L, \ldots, \Lambda(1:K)_{t=\tau}^L\},$$

i.e., the log-likelihoods for the respective models and time instants, —and therefore a vector of K reals for the associated time step. In the experimental examples described below, performance was not significantly improved by using the latter approach. Therefore the results reported correspond to the maxbelief approach, which is generally simpler in nature.

The following discussion describes processes for decomposition per temporal granularity. FIG. 4 highlights decomposing a problem into layers with increasing time granularity. For example, at layer L a sliding time window of $T_L$ samples is provided. The HMMs at this level analyze the data contained in such time window, compute their likelihood and generate an observation for layer L+1 every $T^L$ samples. That observation is the inferential output of the HMMs in level L, as previously described. The sliding factor along with the window length vary with the granularity of each level. At the lowest level of the hierarchy, the samples of the time window are the features extracted from the raw sensor data. At any other level of the hierarchy, the samples are the inferential outputs of the previous level. The higher the level, the larger the time scale——and therefore the higher the level of abstraction—since gathering observations at a higher level typically requires the outputs of lower layers. In a sense, each layer performs time compression before passing data upward.

Automatic estimation of the time granularities $T_L$ from data is a challenging problem both for standard HMMs and LHMMs. In the experiments reported here, the time granularities at each level were determined based on knowledge about the different classes being modeled. Cross-validation was used to select the optimal values from the original set of proposed ones.

Focusing on the example domain of office awareness, a two layer HMM architecture can be employed. The raw sensor signals are processed with time windows of duration about 100 milliseconds (fine-time granularity). Next, the lowest layer of HMMs classify the audio and video data with a time granularity of less than 1 second, for example. This level of description detects a user's presence, by use of audio, keyboard, mouse, and/or video, for example. Furthermore, the second layer of HMMs represents typical office activities, associated with a time granularity of about 5–10 seconds, for example. At another (higher) level, models could describe what the user has done in the last N minutes. Additionally, models can provide an explanation of the user's activities during the day in addition to the states previously described in FIG. 1.

Moreover, employing a hierarchical structure 230 provides several valuable properties. A hierarchical formulation facilitates decoupling different levels of analysis for training and inference. As it is further explained below, respective levels of the hierarchy 230 can be trained independently, with different feature vectors and time granularities. Once the system has been trained, inference can be carried out at any level of the hierarchy 230. Thus, a user or system can retrain the lowest (most sensitive to variations in the environment) level, for example, while mitigating retraining efforts in other levels of the hierarchy 230.

Figure 5:
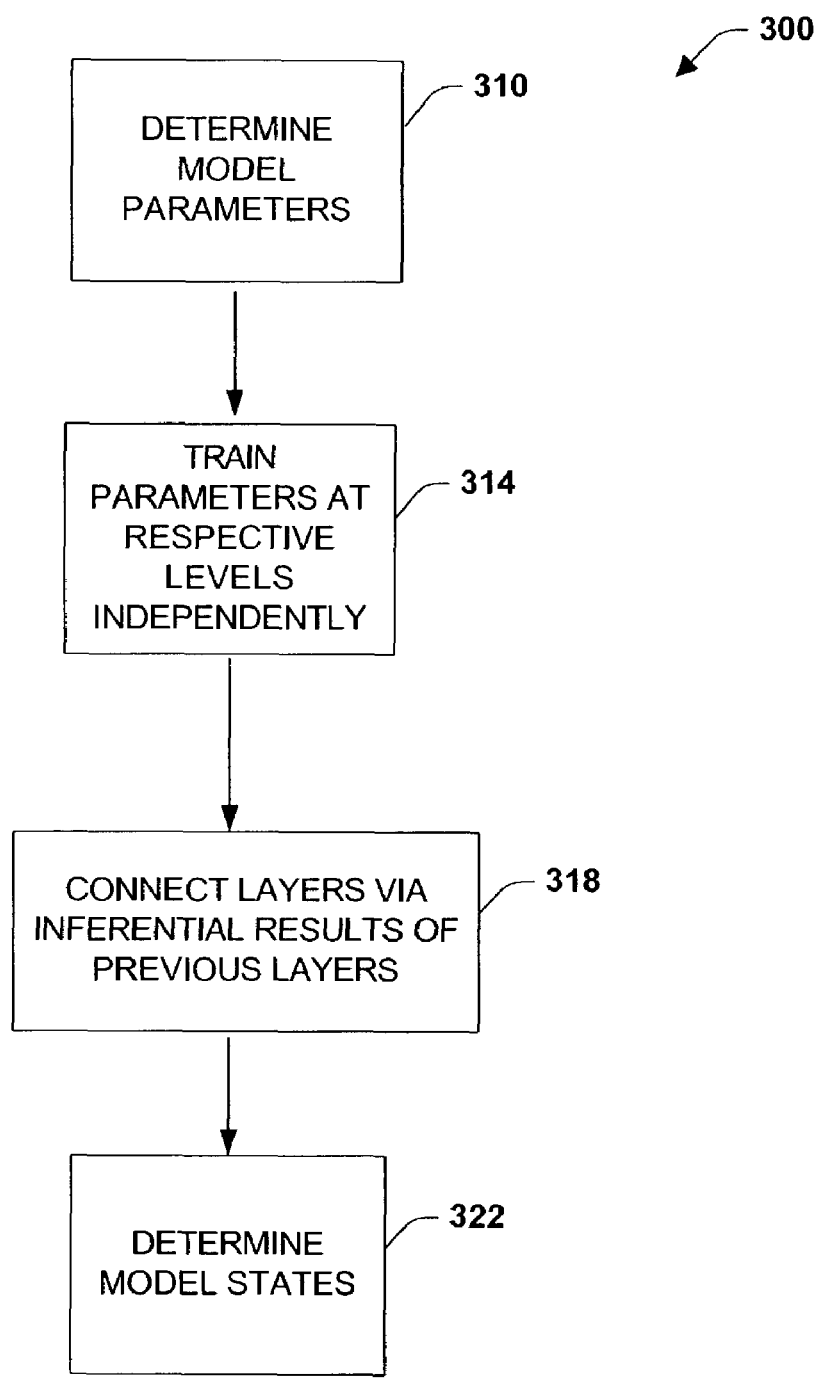
FIG. 5 is a flow diagram illustrating model parametric determinations in accordance with an aspect of the present invention.
Figure 6:
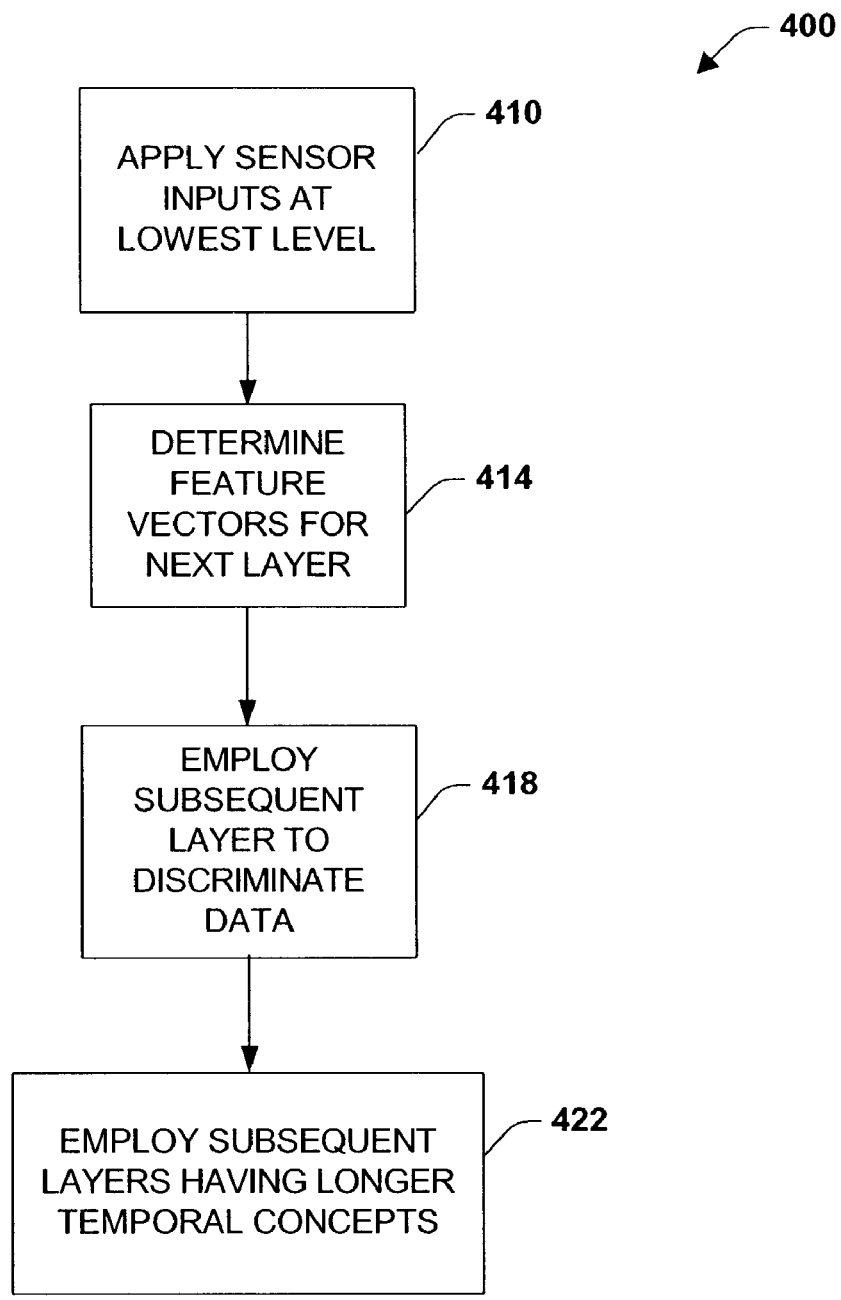
FIG. 6 is a flow diagram illustrating a methodology to facilitate a temporal modeling in accordance with an aspect of the present invention.
Figure 7:
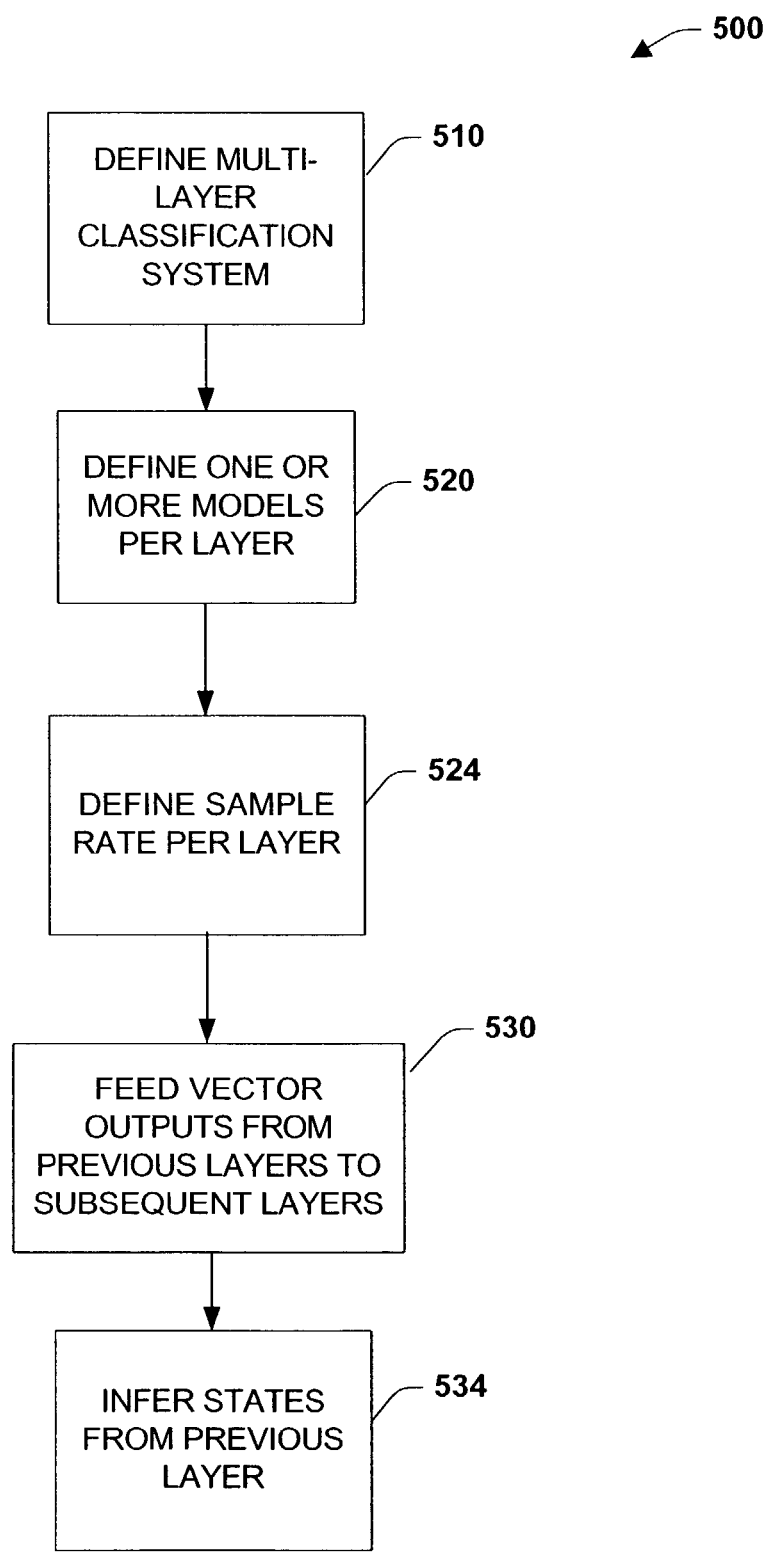
FIG. 7 is a flow diagram illustrating a methodology providing a multi-layer model and analysis in accordance with an aspect of the present invention.

FIGS. 5, 6 and 7 illustrate methodologies to facilitate human modeling in accordance with the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

FIG. 5 illustrates a process 300 for learning model parameters and inferring model states in accordance with the present invention. At 310, model parameters are trained independently for each layer. For an HMM, the problem of learning model parameters can be solved by a forward-backward or Baum-Welch algorithm, for example. This algorithm provides expressions for the forward, $\alpha_t(i)$ and $\beta_t(i)$ variables, whose normalized product leads to $\gamma_t(i)=P(q_t=S_i|O(1:t))$, i.e., the conditional likelihood of a particular state $S_i$ at time t, given $O(1:t)$, i.e., the observations up to time t. The log-likelihood of a sequence of observations is given by $$\Lambda = \log P(O(1:T)) = \log\left[\sum_{i=1}^{N} \alpha_T(i)\right],$$

where N is the number of hidden states in the HMM. In general, the expressions for the $\alpha_t(i)$ and $\beta_t(i)$ variables are:

$$\alpha_{t+1}(j) = \left[\sum_{i=1}^{N} \alpha_t(i)P_{j|i}\right]p_j(o_t) \text{ and } \beta_t(i) = \left[\sum_{i=1}^{N} \beta_{t+1}(j)P_{i|j}p_j(o_{t+1})\right]$$

where N is the number of hidden states, $P_{ij}$ is the probability of state i given state j and $p_i(O_i)$ is the probability for state i of observing $o_t$. From the $\alpha_t(i)$ and $\beta_t(i)$ variables, one can obtain the model parameters (i.e., the observation and transition probabilities).

In one aspect, the standard Baum-Welch algorithm provides an efficient estimation procedure of the model parameters from unlabeled data. A trained model can be applied to an automatic hierarchical parsing of an observation sequence such as a dendrogram. However, because of computational complexities associated with the above algorithm, the present invention provides an efficient approximation to the full estimation scheme. The approximation can further be employed to construct models that adapt both model topology and/or associated parameters.

At 318 respective model layers of the layered architecture are connected to the next layer via its inferential results (e.g., log likelihoods). Moreover, at 314, rather than training all or most of the levels at the same time, the parameters for respective levels of LHMMs can be trained independently by means of the Baum-Welch algorithm described above. Thus, the inputs (observations) of a respective level are the inferential outputs of the previous level. At the lowest level, observations (leaves of a model tree) are feature vectors extracted from sensor signals.

Proceeding to 322, model states are determined. In one aspect, a Viterbi algorithm can be employed that yields a most likely sequence of states $\hat{S}$ within a model given the observation sequence $O=\{O_1, \ldots, O_n\}$. This most likely sequence can be obtained by $\hat{S}=\text{argmax}_s P(S|O)$.

In the case of HMMs, a posterior state sequence probability $P(S|O)$ can be given by:

$$P(S|O) = \frac{P_{s_1}p_{s_1}(o_1)\prod_{t=2}^{T}p_{s_t}(o_t)P_{s_t|s_{t-1}}}{P(O)}$$

wherein $S=\{\alpha_1, \ldots, \alpha_N\}$ is a set of discrete states, $s_t \in S$ corresponds to a state at time t. $P_{s_t=\alpha_j|s_{t-1}=\alpha_i}=P_{ij}$ is a state-to-state transition probability (i.e., probability of being in state $\alpha_j$ at time t given that the system was in state $\alpha_i$ at time t–1). Thus, prior probabilities for an initial state are $P_i=P_{s_1=\alpha_i}=P_{s_i}$.

In addition, $p_i(o_t)=p_{s_t=\alpha_i}(o_t)=p_{s_i}(o_t)$ represent output probabilities for respective states, (i.e., the probability of observing $o_t$ given state $\alpha_i$ at time t). For LHMMs, inference can be performed for respective levels of the hierarchy by a similar process of the Viterbi algorithm as employed for HMMs. It is noted that respective levels encode a different temporal abstraction, going from the finest time granularity, at the leaves, to a lowest time granularity (highest level of temporal abstraction), at the root of the tree.

Referring now to FIG. 6, a multi-layer process 400 is illustrated for audio/video processing and behavioral analysis. As noted above, additional levels can be analyzed if desired (or less), and substantially any type of input stream can be analyzed such as with computer inputs. As one particular example of this analysis, LHMMs can be applied within an office-awareness application that exploits the LHMM representation to learn about and detect activities in an office. It is to be appreciated that activities could be detected in other locations such as at home, in a public place, or in an automobile, for example.

Proceeding to 410 of FIG. 6, and at the lowest level of a probabilistic hierarchy, one or more sensor signals or modalities such as images, audio, keyboard and/or mouse activity, are captured and processed. At 414, a feature vector with data from each modality is created and applied to a subsequent layer. As one particular example, time granularity at the lowest level can be set to a duration less than about 100 milliseconds. At 418, and proceeding from the layer analyzed at 414, inputs can be classified via discriminative HMMs. Discriminative HMMs denote HMMs that have been trained to recognize a particular sound or other type of sensor input. When classifying sounds or other real-time data, substantially all the models can be executed in parallel and/or concurrently. At a determined time, the model with the highest likelihood can be selected.

It is noted that typical office sounds—or other input—can be trained and learned in substantially real time, such as human speech, music, silence, ambient noise, phone ringing and keyboard typing, for example, having a single HMM configured per type of sound or other input. Moreover, the source of sound can be localized utilizing a technique based on a Time Delay of Arrival described below. Video signals can also be classified with discriminative HMMs to implement a person detector. At this level 418, a system detects whether one person is present in a room (semi-static), one active person is present, multiple people are present or there is nobody in the office. The inferential results from this layer at 418 (audio and video classifiers), the derivative of a sound localization component, and a history of keyboard and/or mouse activities constitute a feature vector that is passed to the next higher layer in the hierarchy at 422.

The time granularity at the level depicted at 422 can be set to less than 1 second, for example. The layer 422 handles concepts that have longer temporal extent. Such concepts include the user's high-level activities in or near an office or other location, corresponding to a time granularity of about 5–10 seconds (or other time). The behavior models are HMMs whose observations are the inferential outputs of the previous level as described above. Example activities recognized include PHONE CONVERSATION, FACE TO FACE CONVERSATION, PRESENTATION, DISTANT CONVERSATION, NOBODY IN THE OFFICE (or other location), USER PRESENT, ENGAGED IN SOME OTHER ACTIVITY. As noted above, a plurality of other user states can be determined in accordance with the present invention.

Referring to FIG. 7, a methodology 500 illustrates a hierarchical probabilistic process for analyzing real time data in accordance with the present invention. At 510, a multilevel classification system is defined that provides multiple probabilistic layers for analysis. At 520, one or more probabilistic models can be defined per a respective layer. As noted above, this can include independent model training and parametric determinations per layer. At 524, a sample rate is determined for the layers defined at 510. As noted above, lower classification layers generally are provided with finer time granularities (e.g., smaller sample periods) than higher layers in the classification structure, although layers that are near one another (e.g., within about two classification levels) may be configured with similar time periods. At 530, one or more feature vectors are determined for a respective layer and fed to the next subsequent layer in the hierarchy. At 534, higher-level states are inferred from the results (e.g., feature vector results) passed from previous layers (e.g., behavior, activities, patterns, context).

Figure 8:
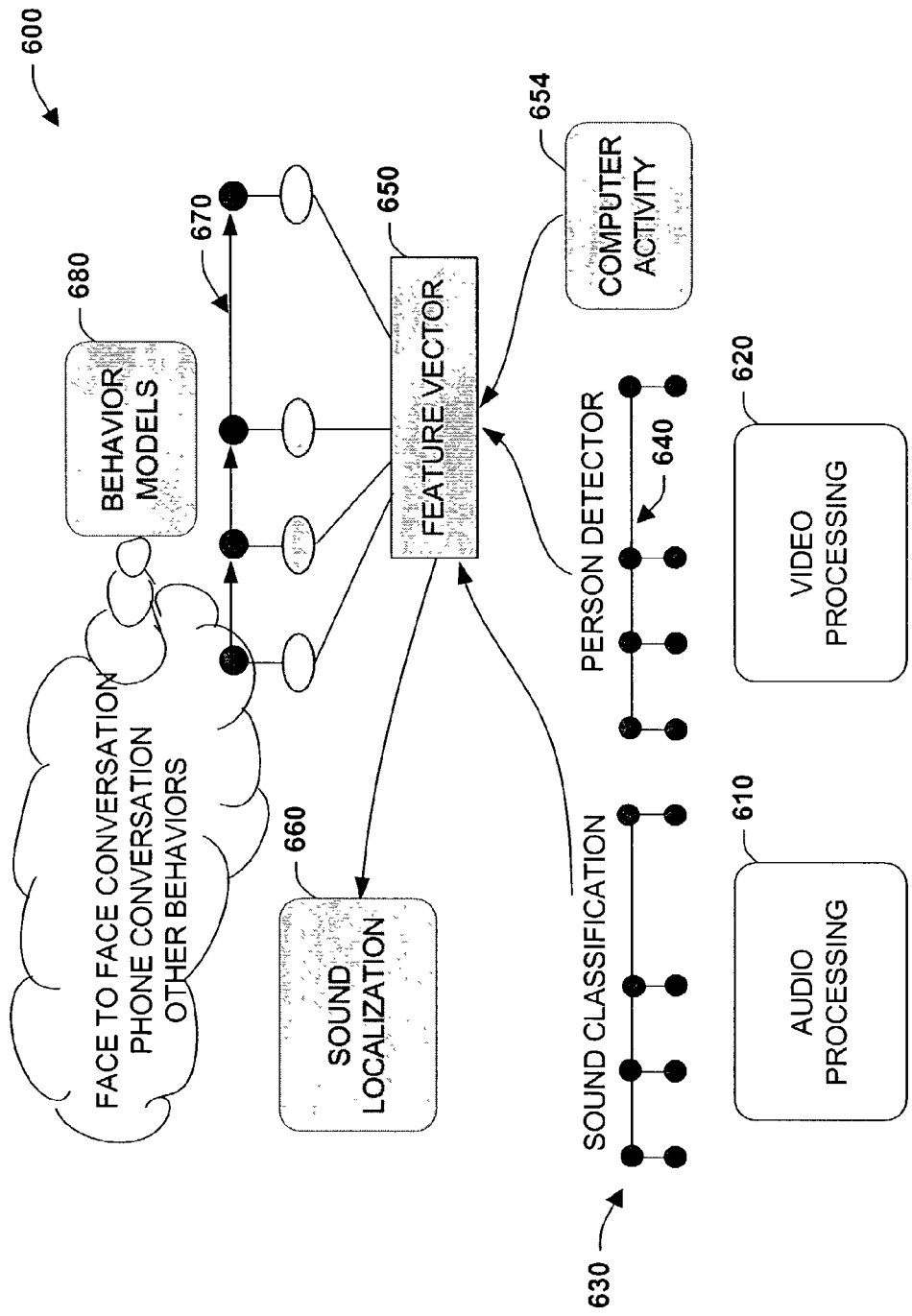
FIG. 8 is a schematic block diagram illustrating an exemplary system employing a hierarchical probabilistic model in accordance with an aspect of the present invention.

Turning now to FIG. 8, a multi-tier system 600 illustrates a multimodal real-time office awareness in accordance with the processes described above. At a lowest level of the system 600, audio and video processing are performed at 610 and 620 (e.g., audio/microphone and video/camera signals captured per a given sample rate) in accordance with sound probabilistic classifiers at 630 and video probabilistic classifiers at 640. The classifiers 630 and 640 generate a feature vector at 650 that also contains entries from computer activities at 654 such as mouse and keyboard activities, and from a sound localization component at 660, via two or more microphones and a Time Delay of Arrival technique. This feature vector at 650 is then processed by a classifier layer at 670 to predict such aspects of human behavior at 680 (e.g., phone conversation, face to face conversation, presentation, distant conversation, nobody at location, user present, engaged in some other activity).

The system 600 can access/process perceptual information from a plurality of sources. For example, audio processing 610 can include one or more microphones such a binaural microphones. This can include two mini-microphones (e.g., 20–16000 Hz, SNR 58 dB) with an audio sample rate at about 44100 KHz or other frequency. The microphones can be employed for sound classification at 630 and localization at 660. Video processing at 620 can include a Universal Serial Bus (USB) camera (or other type of camera), whereby a video signal is obtained via a standard USB camera and sampled at about 30 frames per second or other rate. Video input can be employed to determine the number of persons present in a scene at 640, for example. Computer activity at 654 can include keyboard and mouse processing, wherein the system 600 or component 654 (e.g., computer with keystroke/mouse monitor operating in background) logs a history of keyboard and mouse activities during the past 5 seconds (or other time), for example.

The raw sensor signals described above can be preprocessed to obtain feature vectors (i.e., observations) for the lowest-level HMMs. On the audio side, Linear Predictive Coding (LPC) coefficients can be computed. Feature selection can be applied on these coefficients by a process of principal component analysis (PCA) (or any other feature selection method). The number of features can be selected such that more than about 95% of the variability in the data is maintained, which is typically achieved with no more than 7 features. Other higher-level features can also be extracted from the audio signal, such as the energy, the mean and variance of the fundamental frequency over a time window, including a zero crossing rate which can be expressed as:

$$\text{Zero}(m) = \frac{1}{N} \sum_{n=m-N+1}^{m} \frac{|\text{sign}(s(n)) - \text{sign}(s(n-1))|}{2} \cdot w(m-n)$$

wherein m is a frame number, N is a frame length, w is a window function, s(n) is a digitized audio signal at an index indicator n, and $\text{sign}(s(n)) = \{+1, s(n) \geq 0; -1, s(n) < 0\}$.

As described above, the source of the sound can be localized at 660 via a Time Delay of Arrival (TDOA) process. In TDOA, the measure in question is typically not acoustic data received by the sensors, but rather the time delays between the signals coming from respective sensors. Typically, TDOA based approaches have two parts: a time delay estimation (TDE) and a sound source localization (SSL).

To illustrate this process mathematically, let s(n) be a source signal and let $x_i(n)$ be an i-th sensor received signal. If no reverberation is assumed, then $x_i(n) = a_i s(n-t_i) + b_i(n)$. To model reverberation, a non-linear reverberation function can be added: $x_i(n) = g_i * s(n-t_i) + b_i(n)$, wherein $\alpha_i$ is an attenuation factor, $b_i$ is additive noise and $g_i$ is a response between a source and the sensor. In addition, multiple approaches can be provided for estimating the time delay of arrival between the left and right audio signals. In one aspect, suitable performance can be achieved by estimating the peak of a time cross-correlation function between the left and right audio signals over a finite time window $$[N1, N2], \text{i.e.,}: r_{l_r}(d) = \sum_{n=N_1}^{n=N_2} l(n) r(n-d).$$

On the video side, four features (or other number) can be computed, for example: a density of skin color in the image (e.g., obtained via a discriminative histogram between skin and non-skin in HSV space), a density of motion in the image (e.g., obtained by image differences), a density of foreground pixels in the image (e.g., obtained by background subtraction, after having learned the background), and a density of face pixels in the image (obtained by means of a real-time face detector). Also, as noted above, a history of the last 5 seconds (or other times) of mouse and keyboard activities can be logged.

The following discussion describes some of the actual performance aspects of the system 600. In addition, another system (not shown) was adapted with a conventional HMM and results were compared between the conventional, single-dimension arrangement and the multi-tier approach of the present invention. The system 600 was tested in multiple offices, with different users and respective environments for several weeks. In preliminary tests, it was found that the higher-level layers of the hierarchy are quite robust to changes in the environment. Thus, when the system 600 was relocated from one office to another, substantially consistent performance was achieved while mitigating the need for retraining the higher levels of the hierarchy. Typically, only some of the lowest-level features (e.g., such as the ambient noise, the background image, and the skin color threshold) required retraining to tune the lowest hierarchy level to new conditions. Thus, it was observed that the hierarchical structure greatly contributes to the overall robustness of the system 600 given changes in the environment, for example.

In a more quantitative study, the performance of the layered model was compared with that of single, standard HMMs. The feature vector in the latter case results from the concatenation of the audio, video and keyboard/mouse activities features in a long feature vector. These type HMMs are referred to as the Cartesian Product HMMs (CP HMMs). The number of parameters to estimate is much lower for LHMMs than for CP HMMs. For example, a five-state HMM with single Gaussian observations of dimensionality 16 may have 5*(16+16+120)=760 parameters to estimate. A equivalent LHMM with 2 levels, two five-state HMMs with three-dimensional Gaussian observations at the highest level, and one five-state HMM with ten-dimensional Gaussian observations at the lowest level, may have 5*(10+10+45)+5*(3+3+3)+5*(3+3+3)=445 parameters. Consequently, encoding prior knowledge about the problem in the layered structure of the models significantly reduces the dimensionality of the problem. Therefore, for similar amounts of training data, it is expected for LHMMs to have superior performance than HMMs, wherein experimental results further confirm such expectation.

It is noted that it is not substantially more difficult to estimate the structure of LHMMs when compared to HMMs. For HMMs and LHMMs the structure of the models can be estimated—and in the respective levels for LHMMs—employing cross-validation, for example. Typically, the only additional consideration when designing an LHMM architecture is determining the number of levels and associated time granularities to provide. In the experiments, however, it was found that an intuition and knowledge can be developed about the problem at hand to estimate how many layers to use and the time span of the respective layer.

As an example of such experiments, results were compared on the performance of 30 minutes of office activity data (e.g., 5 minutes per activity and 6 activities) of LHMMs and HMMs. Given that it was recorded activity data, the ground truth was known for each activity. Generally, the first few seconds of the datasets were ignored for classification purposes, due to a small lag of the models in recognizing an activity. The results are summarized in table 1 below, wherein the HMMs were tuned to the particular testing data, and the LHMMs had been trained many days before, under different office conditions than that of testing.

TABLE 1

|     | PC | FFC | P | O | NA | DC |
| --- | --- | --- | --- | --- | --- | --- |
| Confusion Matrix for Highly-Tuned HMMs | | | | | | |
| PC  | 0.8145 | 0.0679 | 0.0676 | 0.0 | 0.0 | 0.05 |
| FFC | 0.0014 | 0.9986 | 0.0 | 0.0 | 0.0 | 0.0 |
| P   | 0.0 | 0.0052 | 0.9948 | 0.0 | 0.0 | 0.0 |
| O   | 0.0345 | 0.0041 | 0.003 | 0.9610 | 0.0 | 0.0 |
| NA  | 0.0341 | 0.0038 | 0.0010 | 0.2524 | 0.7086 | 0.0 |
| DC  | 0.0076 | 0.0059 | 0.0065 | 0.0 | 0.0 | 0.98 |
| Confusion Matrix for Generic LHMMs | | | | | | |
| PC  | 1.0 | 0.0 | 0.0 | 0.0 | 0.0 | 0.0 |
| FFC | 0.0 | 1.0 | 0.0 | 0.0 | 0.0 | 0.0 |
| P   | 0.0 | 0.0 | 1.0 | 0.0 | 0.0 | 0.0 |
| O   | 0.0 | 0.0 | 0.0 | 1.0 | 0.0 | 0.0 |
| NA  | 0.0 | 0.0 | 0.0 | 0.0 | 1.0 | 0.0 |
| DC  | 0.0 | 0.0 | 0.0 | 0.0 | 0.0034 | 0.9966 |

Table 1: Confusion matrix for highly-tuned HMMs and generic LHMMs on 30 min of real data, where PC = Phone Conversation; FFC = Face to Face Conversation; P = Presentation; O = Other Activity; NA = Nobody Around; DC = Distant Conversion.

From these experiments it was noted that for similar amounts of data, the accuracy of LHMMs is significantly higher than that of HMMs. There are several possible reasons for the better performance of LHMMs when compared to HMMs: (a) The number of parameters of HMMs is about 40% higher than that of LHMMs for the activities being modeled in the experiments. As a consequence, for about the same amount of training data, HMMs have many more parameters to estimate than LHMMs. Therefore, HMMs are generally more prone to over-fitting and worse generalization than LHMMs, especially when trained with limited amounts of data; (b) HMMs carry out high-level inferences about the user's activity, directly from the raw sensor signals. LHMMs, on the other hand, isolate the sensor signals in a different sub-HMM for respective input modalities. The inferential results of these models feed the HMMs in the next layer, in order to characterize human activities. Due to its layered structure, LHMMs appear to be more robust to noise in the sensor signals and have better generalization performance than HMMs.

In another aspect, it was observed that LHMMs are more robust to changes in the environment than HMMs. In general, reasonable performance on HMMs could not be attained unless the models had been highly tuned to a particular testing environment and conditions. In contrast, LHMMs generally did not require retraining, despite changes in office conditions. It was also observed that the discriminative power of LHMMs is notably higher than that of HMMs, wherein discriminative power includes a determination of the distance between the log-likelihood of the two most likely models. The log likelihoods for the HMMs tend to be much closer to one another, thus, showing these models to be prone to instability and errors in classification.

In view of the systems, processes and experiments described above, LHMMs facilitate inferences about context and activity from various perceptual signals. Some important characteristics of LHMMs when compared to HMMs are: (1) LHMMs encode the hierarchical temporal structure of a discrimination problem; thus, the dimensionality of the state space that needs to be learned from data is smaller than that of corresponding Cartesian Product HMMs; (2) LHMMs are easier to interpret, and, thus, easier to refine and improve, than corresponding CP HMMs; (3) LHMMs can encode different levels of abstraction and time granularities that can be linked to different levels of representation for human behaviors; (4) the modularity of LHMMs enables selective retraining of the levels that are most sensitive to environmental or sensor variation, mitigating the burden of training during transfer among different environments.

Figure 9:
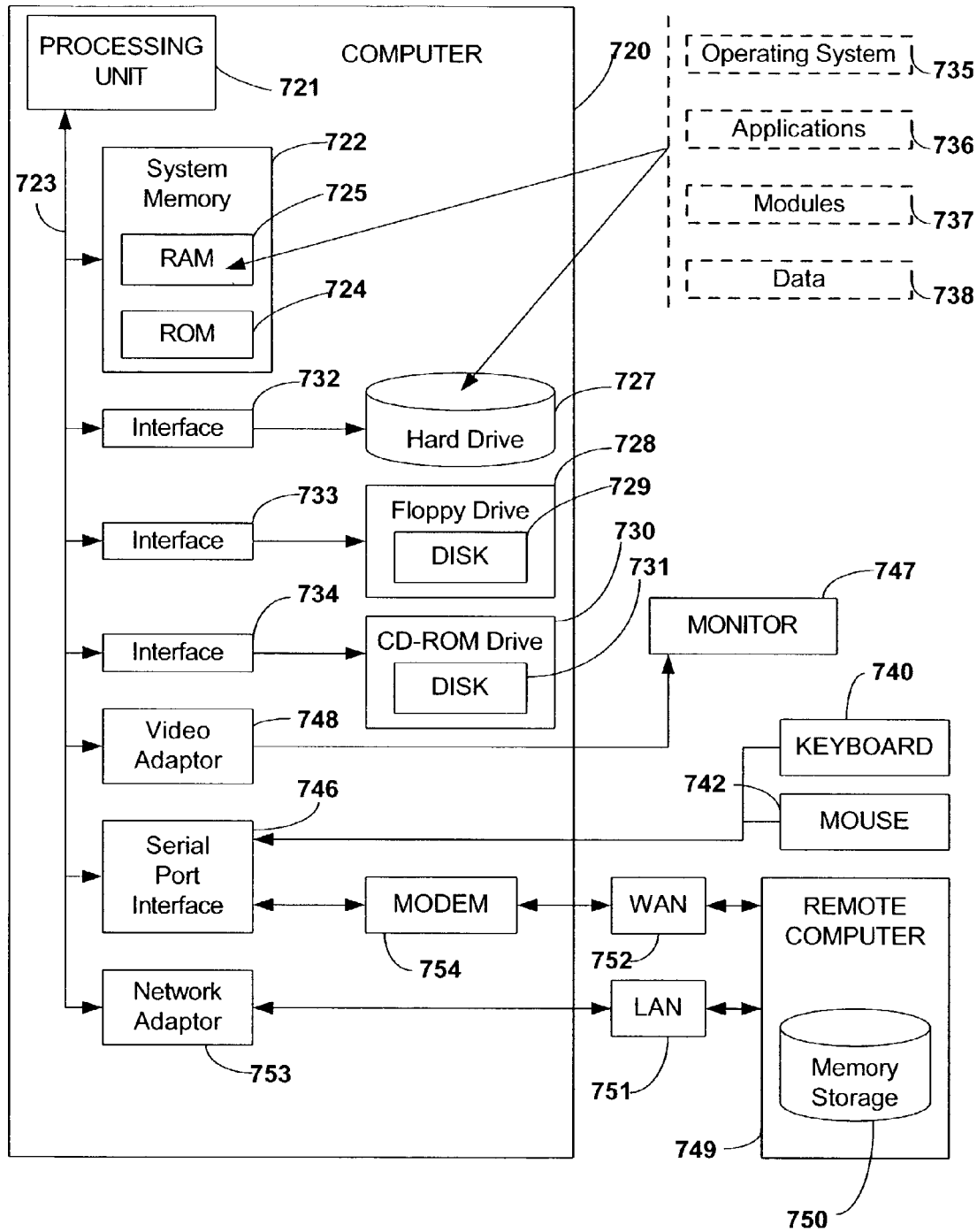
FIG. 9 is a schematic block diagram illustrating a suitable operating environment in accordance with an aspect of the present invention.

In order to provide a context for the various aspects of the invention, FIG. 9 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 9, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 9. The logical connections depicted in FIG. 9 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A learning system for signal processing comprising a computer processor and memory for executing the following components, the system is recorded on a computer-readable medium and capable of execution by a computer, comprising the:
   N classification layers, each of the N classification layers associated with $M_N$ probabilistic models per layer, N and M being integers, respectively;
   at least one parameter defined per a respective classification layer, the parameters trained independently at different classification layers;
   at least one input stream that is analyzed by the N classification layers, at least one of the input streams sampled according to varying levels of temporal granularity at the respective classification layers;
   a plurality of time inputs that are applied as sample inputs to the respective layers, the plurality of time inputs are arranged in a descending order of temporal granularity, the descending order refers to lower levels of the N classification layers being sampled at finer time granularities than higher levels of the N classification layers;
   wherein the N classification layers analyze multiple input streams to determine at least one state associated with a human characteristic, the multiple input streams include at least one of audio data, video data, computer activity data, and other contextual activity data, and wherein at least one of the determined states is stored to enable a computer event; and
   at least one computer event that is enabled from at least one of the state, and at least one of the computer events is at least one of anticipated, altered, tuned, and adjusted in accordance with a determined state.

2. The system of claim 1, the computer activity data relates to at least one of mouse movements, applications activity, and keyboard strokes.

3. The system of claim 1, the at least one state includes a context state, the context state defines at least one of what is a user doing, how busy the user is, how focused the user is, and where attentional resources of the user are being applied.

4. The system of claim 1, the at least one state includes at least one of a user activity and a user pattern, the user activity includes at least one of a phone conversation, a face-face conversation, a presentation, a distant conversation, no person in the office, user present, other activity engaged.

5. The system of claim 1, the at least one state includes a behavior, the at least one behavior includes at least one of happy, upset died, relaxed, and excited.

6. The system of claim 5, further comprising at least one of inferences about possible states and implied states.

7. The system of claim 1, the at least one computer event further comprising at least one of invoking an application, adjusting the application, altering timing of the application, providing feedback from the application, adjusting one or more controls, providing information utilities to the user based on the determined state, and executing a subsequent algorithm based upon the determined state.

8. The system of claim 1, further comprising at least one feature vector that is generated by a respective classification layer, the feature vector being passed to a subsequent stage for probabilistic processing.

9. The system of claim 1, the N classification layers are at least one of concurrently processed and serially processed.

10. The system of claim 1, the N classification layers provide a hierarchical configuration to support learning human activities from sensed data.

11. The system of claim 10, the hierarchical configuration employs at least one of Directed Acyclic Graphs (DAG) and Dynamic Graphical Models, the Directed Acyclic Graphs (DAG) and Dynamic Graphical Models include Dynamic Bayesian Networks, a Hidden Markov Model (HMM), and a hierarchically arranged layered Hidden Markov Model (LHMM).

12. The system of claim 11, the DAG includes a set of random variables represented as nodes and one or more directed edges between the nodes.

13. The system of claim 12, the DAG defines a mathematical form of conditional Probability Distribution Function (PDF) between the random variables.

14. The system of claim 11, the HMM performs a quantization of a system configuration space into a small number of discrete states having probabilities for transitions between the states.

15. The system of claim 14, further comprising a finite discrete variable to index a current state of the system.

16. The system of claim 1, the $M_n$ probabilistic models further comprise at least one of Support Vector Machines (SVM), Naive Bayes, Bayesian Network, Dynamic Graphical Models, Decision Trees, Similarity-based, and Vector-based Models.

17. A computer-implemented method to facilitate learning in a sampled data system, comprising the following computer-executed acts:
   determining a plurality of parameters for a layered classification system, each layer of the layered classification system includes M associated probabilistic models, M being an integer greater than 1;
   connecting at least two layers of the layered classification system, via an inferential result from a lower classification layer to a higher classification layer;
   training the plurality of parameters that are configured on different layers of the layered classification system independently;
   applying a plurality of time inputs as sample inputs to the layers, the plurality of time inputs are arranged in a descending order of temporal granularity, the descending order refers to lower levels of the N classification layers being sampled at finer time granularities than higher levels of the N classification layers;
   determining at least one model state from the layered classification system;
   storing at least one of the determined model states for adjusting a computer event; and
   adjusting at least one computer event based upon at least one of the determined model states, the computer event comprises at least one of adjusting computer applications, adjusting timing, providing feedback, and changing at least one control.

18. The method of claim 17, further comprising learning the plurality of parameters by solving a forward-backward algorithm.

19. The method of claim 18, the forward-backward algorithm provides expressions for an $\alpha_t(i)$ and $\beta_r(i)$ variables forming a normalized product leads to $\gamma_t(i)=P(q_t=S_i|O(1:t))$, wherein a conditional likelihood of a particular state $S_i$ at time t, is given as O(1:t), representing observations up to time t, the $\alpha_t$ (i) variable is expressed as:

$$\alpha_{t+1}(j) = \left[\sum_{i=1}^{N} \alpha_t(i) P_{j|i}\right] p_j(o_t),$$

the $\beta_t$ (i) variable is expressed as:

$$\beta_t(i) = \left[\sum_{i=1}^{N} \beta_{t+1}(j) P_{i|j} p_j(o_{t+1})\right],$$

wherein N is the number of hidden states, $P_{j|i}$ is the probability of state i given state j and $p_i$ ($o_t$) is the probability for state i of observing $o_t$.

20. The method of claim 17 the at least one model state is determined via a Viterbi algorithm that yields a most likely sequence of states Ŝ within the model given an observation sequence O={$O_I$, . . . ,$O_n$}.

21. The method of claim 20, the most likely sequence of states Ŝ determined by Ŝ=argmax$_s$P(S|O).

22. The method of claim 21, further comprising a posterior state sequence probability P(S|O) that is expressed as:

$$P(S \mid O) = \frac{P_{s_I} p_{s_I}(o_1) \prod_{t=2}^{T} p_{s_t}(o_t) P_{s_t|s_{t-1}}}{P(O)}$$

wherein S={$a_1$, . . . ,$a_N$}; is a set of discrete states, $s_t \in S$ corresponds to a state at time t, and $P_{ij}=P_{s_t=a_i \mid s_{t-1}=a_j}$ is a stats-to-state transition probability.

23. The method of claim 22, further comprising determining prior probabilities for an initial state as $P_i=P_{s_i=a_i}=P_{s_1}$ and determining $p_i(o_t)=p_{s_t=a_i}(o_t=p_{s_t}(o_t))$ to represent output probabilities for respective states.

24. A computer-implemented method to facilitate signal processing in an intelligent system, comprising the following computer-executed acts:
applying a plurality of sensor signals at a base layer of a probabilistic hierarchy;
determining at least one feature vector for an intermediary layer of the probabilistic hierarchy;
employing a tertiary layer of the probabilistic hierarchy to discriminate data;
applying a plurality of time inputs as sample inputs to the base, intermediary and tertiary layers, the plurality of time inputs are arranged in a descending order of temporal granularity, the descending order refers to lower levels of the N classification layers being sampled at finer time granularities than higher levels of the N classification layers;
associating longer temporal concepts with subsequent layers of the probabilistic hierarchy, the base layer, the intermediary layer, the tertiary layer and subsequent layers of the probabilistic hierarchy comprise a plurality of probabilistic models;
determining at least one model state from the base, intermediary and tertiary layers;
storing at least one of the determined model states for adjusting a computer event; and
adjusting at least one computer event based upon at least one of the determined model state, the computer event comprises at least one of adjusting computer applications, adjusting timing, providing feedback and changing at least one control.

25. The method of claim 24, further comprising applying the probabilistic hierarchy within an awareness application in order to at least one of learn and detect activities associated with the application.

26. The method of claim 25, the activities are associated with at least one of an office, a location, a home, a public place, and an automobile.

27. The method of claim 24, further comprising discriminating data by training at least one HMM to recognize a sensor input.

28. The method of claim 24, further comprising classifying audio signals with at least one HMM in order to implement a sound classifier.

29. The method of claim 24, further comprising a sound that is localized utilizing a Time Delay of Arrival technique.

30. The method of claim 24, further comprising classifying video signals with at least one HMM in order to implement a person detector.

31. A computer-implemented method to facilitate real time signal processing, comprising the following computer-executed acts:
defining a multi-layer classification system;
defining one or more probabilistic models per a respective layer of the multi-layer classification system;
defining different sample rates per the respective layer;
applying a plurality of time inputs as sample inputs to the respective layers, the plurality of time inputs are arranged in a descending order of temporal granularity, the descending order refers to lower levels of the N classification layers being sampled at finer time granularities than higher levels of the N classification layers;
feeding inferential outputs from previous layers to subsequent layers of the multi-layer classification system;
inferring multiple states from analytical results derived from previous layers;
storing the inferred model states for adjusting a computer event; and
adjusting at least one computer event based upon the inferred multiple states, the computer event comprises at least one of adjusting computer applications, adjusting timing, providing feedback, and changing at least one control.

32. An analysis system comprising a computer processor and memory for executing the following software components, the system is recorded on a computer-readable medium and capable of execution by a computer, comprising:
at least one processing component at a lowest layer of a classification system to analyze multiple signal input streams;
at least one feature vector indicating results from a portion of the lowest layer; and
at least one behavioral model executable on a highest layer of the classification system to infer human behavior based at least in part on the feature vector, the lowest layer, the higher layer and intermediary layers of the classification system comprise a plurality of probabilistic models
a plurality of time inputs that are applied as sample inputs to the lowest and highest layers, the plurality of time inputs are arranged in a descending order of temporal granularity, the descending order refers to lower levels of the N classification layers being sampled at finer time granularities than higher levels of the N classification layers, and wherein the inferred human behavior is stared to enable a computer event; and at least one computer event that is enabled from the inferred human behavior, at least one of the computer events is at least one of anticipated, altered, tuned, and adjusted in accordance with the inferred human behavior.

33. The system of claim 32, the human behavior includes at least one of phone conversation, face-to-face conversation, conversation, presentation, distant conversation, nobody at location, user present, and engaged in some other activity.

34. The system of claim 32, further comprising at least one of binaural microphones to provide audio inputs, and a Universal Serial Bus (USB) camera to provide video signals.

35. The system of claim 32, the processing component determines Linear Predictive Coding (LPC) coefficients and applies a feature selection on the coefficients by a process of principal component analysis (PCA).

36. The system of claim 32, the processing component extracts higher-level features from the input streams including at least one of an energy computation, a mean and variance of a fundamental frequency over a time window computation, and a zero crossing rate determination.

37. The system of claim 36, the zero crossing rate determination is expressed as:

$$Zero(m) = \frac{1}{N} \sum_{n=m-N+1}^{m} \frac{|\text{sign}(s(n)) - \text{sign}(s(n-1))|}{2} \cdot w(m-n)$$

wherein m is a frame number, N is a frame length, w is a window function, s(n) is a digitized speech signal at an index indicator n, and $\text{sign}(s(n)) = \{+1, s(n) \geq 0; -1, s(n) < 0\}$.

38. The system of claim 32, further comprising a component to determine a feature, the feature including at least one of a density of skin color in an image, a density of motion in the image, a density of foreground pixels in the image and a density of face pixels in the image.

39. The system of claim 32, further comprising a localization component to localize sound, the localization component employing a Time Delay of Arrival (TDOA) process.

40. The system of claim 39, the TDOA determines time delays between signals originating from different sensors, the TDOA includes at least one of a time delay estimation (TDE) and a sound source localization (SSL).

41. A system to facilitate computer signal processing comprising a computer processor and memory for executing the following software components, the system is recorded on a computer-readable medium and capable of execution by a computer, comprising:

means for configuring a multi-layer classification system;
means for training one or more probabilistic models per a respective layer of the multi-layer classification system;
means for providing various time sample rates per the respective layer;
means for applying a plurality of time inputs as sample inputs to the respective layers, the plurality of time inputs are arranged in a descending order of temporal granularity, the descending order refers to lower levels of the N classification layers being sampled at finer time granularities than higher levels of the N classification layers;
means for feeding inferential outputs from previous layers to subsequent layers of the multi-layer classification system;
means for inferring multiple human states from analytical results derived from previous layers;
means for storing the inferred multiple human states for adjusting a computer event; and
means for adjusting at least one computer event based upon the inferred multiple human states, the computer event comprises at least one of adjusting computer applications, adjusting timing, providing feedback, and changing at least one control.

42. A signal to communicate sensor data between at least two nodes system for signal processing, comprising a computer processor and memory for executing the following components, the signal is recorded on a computer-readable medium and capable of execution by a computer, comprising:

a first data packet comprising:
an N layered classification component employed to communicate probabilistic results between at least two layers of N layered classification system; and
at least one parameter defined per a respective classification layer, the parameters trained independently at different classification layers; and
at least one input stream that is analyzed by the N classification layers, at least one of the input streams is sampled according to varying levels of temporal granularity at the respective classification layers, the N layered classification component and the different classification layers comprise M probabilistic models, M and N being integers greater than 1;
a plurality of time inputs that are applied as sample inputs to the respective layers, the plurality of time inputs are arranged in a descending order of temporal granularity, the descending order refers to lower levels of the N classification layers being sampled at finer time granularities than higher levels of the N classification layers;
wherein the N classification layers analyze multiple input streams to determine at least one state associated with a human characteristic, the multiple input streams include at least one of audio data, video data, computer activity data, and other contextual activity data, and wherein at least one of the states is stored to enable a computer event; and
at least one computer event that is enabled from at least one of the states, and at least one of the computer events is at least one of anticipated, altered, tuned, and adjusted in accordance with a determined state.

* * * * *